US009053609B2

(12) United States Patent
DeFrance et al.

(10) Patent No.: US 9,053,609 B2
(45) Date of Patent: Jun. 9, 2015

(54) PATTERN MATCHING IN A KENO GAME

(71) Applicant: International Game Technology, Reno, NV (US)

(72) Inventors: Daniel L. DeFrance, Bozeman, MT (US); Jerry L. Byrd, Bozeman, MT (US); Christopher K Sehy, Bozeman, MT (US); Tyson Joehler, Bozeman, MT (US); Ross D Wenker, Reno, NV (US); Bradford D. Brown, Sparks, NV (US)

(73) Assignee: IGT, Las Vegas, NV (US)

( * ) Notice: Subject to any disclaimer, the term of this patent is extended or adjusted under 35 U.S.C. 154(b) by 42 days.

(21) Appl. No.: 13/830,168

(22) Filed: Mar. 14, 2013

(65) Prior Publication Data

US 2014/0274275 A1 Sep. 18, 2014

(51) Int. Cl.

| | |
|---|---|
| ***A63F 9/24*** | (2006.01) |
| ***A63F 13/00*** | (2014.01) |
| ***G07F 17/00*** | (2006.01) |
| ***G07F 19/00*** | (2006.01) |
| ***G07F 17/32*** | (2006.01) |

(52) U.S. Cl.
CPC ............ *G07F 17/326* (2013.01); *G07F 17/329* (2013.01)

(58) Field of Classification Search
USPC ...................................................... 463/17, 18
See application file for complete search history.

(56) References Cited

U.S. PATENT DOCUMENTS 4,033,588 A 7/1977 Watts
4,611,811 A 9/1986 Haase
4,661,906 A 4/1987 DiFrancesco et al.
4,711,454 A 12/1987 Small
4,747,600 A 5/1988 Richardson
4,775,155 A 10/1988 Lees
4,798,387 A 1/1989 Richardson
4,875,686 A 10/1989 Timms
5,005,840 A 4/1991 Schwartz
5,043,887 A 8/1991 Richardson
5,046,737 A 9/1991 Fienberg
5,072,381 A 12/1991 Richardson et al.
5,100,139 A 3/1992 Di Bella
5,116,049 A 5/1992 Sludikoff et al.
5,158,293 A 10/1992 Mullins
5,351,970 A 10/1994 Fioretti
5,401,024 A 3/1995 Simunek
5,419,592 A 5/1995 Stuart
5,482,289 A 1/1996 Weingardt
5,569,083 A 10/1996 Fioretti
5,586,937 A 12/1996 Menashe
5,639,089 A 6/1997 Matsumoto et al.
5,647,798 A 7/1997 Falciglia
5,651,735 A 7/1997 Baba
5,679,077 A 10/1997 Pocock et al.
5,687,971 A 11/1997 Khaladkar
5,718,631 A 2/1998 Invencion
5,727,786 A 3/1998 Weingardt
5,743,526 A 4/1998 Inoue (Continued)

*Primary Examiner* — Kevin Y Kim
(74) *Attorney, Agent, or Firm* — Neal, Gerber & Eisenberg LLP

(57) ABSTRACT

A method for determining an award during a keno game includes, but is not limited to any of combination of: generating a predetermined number of draws for placement on a keno board during the keno game, wherein the keno board includes a predetermined number of spots; evaluating a plurality of sub-regions of the keno board associated with the keno game for matches between the generated draws and one or more predetermined patterns; and determining an award based on results of the evaluating step.

23 Claims, 8 Drawing Sheets

(56) References Cited

U.S. PATENT DOCUMENTS 5,755,619 A 5/1998 Matsumoto et al.
5,779,545 A 7/1998 Berg et al.
5,813,911 A * 9/1998 Margolin .......................... 463/19
5,823,534 A 10/1998 Banyai
5,857,911 A 1/1999 Fioretti
5,871,398 A 2/1999 Schneier et al.
5,909,875 A 6/1999 Weingardt
5,935,001 A 8/1999 Baba
5,935,002 A 8/1999 Falciglia
5,945,655 A 8/1999 Gilgeous et al.
6,017,032 A 1/2000 Grippo et al.
6,024,640 A 2/2000 Walker et al.
6,079,711 A 6/2000 Wei et al.
6,099,407 A 8/2000 Parker et al.
6,102,400 A 8/2000 Scott et al.
6,146,272 A 11/2000 Walker et al.
6,168,521 B1 1/2001 Luciano et al.
6,183,361 B1 2/2001 Cummings et al.
6,210,276 B1 4/2001 Mullins
6,220,961 B1 4/2001 Keane et al.
6,241,606 B1 6/2001 Riendeau et al.
6,250,685 B1 6/2001 Walker et al.
6,257,980 B1 7/2001 Santini, Jr.
6,315,290 B1 11/2001 Roethel et al.
6,315,291 B1 11/2001 Moody
6,325,716 B1 12/2001 Walker et al.
6,334,814 B1 1/2002 Adams
6,346,043 B1 2/2002 Colin et al.
6,358,151 B1 3/2002 Enzminger et al.
6,364,313 B1 4/2002 Moody
6,368,213 B1 4/2002 McNabola
6,368,214 B1 4/2002 Luciano
6,398,644 B1 6/2002 Perrie et al.
6,398,646 B1 6/2002 Wei et al.
6,402,614 B1 6/2002 Schneier et al.
6,425,823 B1 7/2002 Byrne
6,478,677 B1 11/2002 Moody
6,482,088 B2 11/2002 Santini, Jr.
6,514,144 B2 2/2003 Riendeau et al.
6,524,184 B1 2/2003 Lind et al.
6,524,185 B2 2/2003 Lind
6,533,660 B2 3/2003 Seelig et al.
6,554,703 B1 4/2003 Bussick et al.
6,565,091 B2 5/2003 Weingardt
6,569,017 B2 5/2003 Enzminger et al.
6,581,935 B1 6/2003 Odom
6,585,590 B2 7/2003 Malone
6,599,188 B2 7/2003 Hirsch et al.
6,607,440 B2 8/2003 Santini, Jr.
6,609,973 B1 8/2003 Weiss
6,632,139 B1 10/2003 Baerlocher
6,645,072 B1 11/2003 Kellen
6,656,044 B1 12/2003 Lewis
6,656,045 B2 12/2003 Wei et al.
6,669,559 B1 12/2003 Baerlocher et al.
6,722,655 B1 4/2004 Camero
6,746,328 B2 6/2004 Cannon et al.
6,749,502 B2 6/2004 Baerlocher
6,755,738 B2 6/2004 Glasson et al.
6,755,739 B2 6/2004 Santini, Jr.
6,780,108 B1 8/2004 Luciano et al.
6,802,776 B2 10/2004 Lind et al.
6,824,465 B2 11/2004 Luciano, Jr.
6,832,956 B1 12/2004 Boyd et al.
6,840,858 B2 1/2005 Adams
6,855,053 B2 2/2005 Baerlocher et al.
6,939,229 B2 9/2005 McClintic
6,964,416 B2 11/2005 McClintic et al.
7,040,983 B2 5/2006 Dolloff et al.
7,056,192 B2 6/2006 Venigalla et al.
7,128,646 B2 10/2006 Baerlocher et al.
7,252,591 B2 8/2007 Van Asdale
7,258,608 B2 8/2007 Khal
7,303,469 B2 12/2007 Kaminkow
7,306,519 B2 12/2007 Baerlocher
7,399,226 B2 7/2008 Mishra
7,399,227 B2 7/2008 Michaelson et al.
7,448,948 B2 11/2008 Hughs-Baird et al.
7,544,129 B2 6/2009 Baerlocher
7,682,241 B2 3/2010 Baerlocher
7,824,257 B2 11/2010 Jubinville et al.
7,874,908 B2 1/2011 Walker et al.
7,901,282 B2 3/2011 Cannon
8,025,561 B2 9/2011 Reddicks et al.
8,277,302 B2 10/2012 Walker et al.
2001/0031659 A1* 10/2001 Perrie et al. ..................... 463/18
2002/0045472 A1 4/2002 Adams
2002/0052231 A1 5/2002 Fioretti
2002/0094859 A1 7/2002 Hirsch et al.
2002/0098883 A1 7/2002 Packes et al.
2002/0111207 A1 8/2002 Lind et al.
2002/0111214 A1 8/2002 Lind et al.
2002/0113369 A1 8/2002 Weingardt
2002/0117803 A1 8/2002 Weingardt
2002/0137562 A1 9/2002 Malone
2002/0155877 A1 10/2002 Enzminger et al.
2002/0169018 A1 11/2002 Schneier et al.
2002/0177478 A1 11/2002 Glasson et al.
2003/0017867 A1 1/2003 Dekeller
2003/0127793 A1 7/2003 Adams
2003/0144050 A1 7/2003 Keaton et al.
2003/0171986 A1 9/2003 Itkis et al.
2003/0178771 A1 9/2003 Banyai
2003/0181234 A1 9/2003 Falciglia, Sr.
2003/0193136 A1 10/2003 Walker et al.
2003/0195032 A1 10/2003 Enzminger et al.
2004/0009806 A1 1/2004 Odom
2004/0048647 A1 3/2004 Lind et al.
2004/0053669 A1 3/2004 Gerrard et al.
2004/0106445 A1 6/2004 Perrie et al.
2004/0121834 A1 6/2004 Libby et al.
2004/0130096 A1 7/2004 Duhamel
2004/0152499 A1 8/2004 Lind et al.
2004/0166920 A1 8/2004 Boyd et al.
2004/0176169 A1 9/2004 Lind et al.
2004/0178579 A1 9/2004 Lowell et al.
2004/0204225 A1 10/2004 Campo et al.
2004/0214626 A1 10/2004 Lind et al.
2004/0235555 A1 11/2004 Yarbrough et al.
2004/0242310 A1 12/2004 Perkins
2004/0251628 A1 12/2004 Kilby
2004/0266509 A1 12/2004 Bennett et al.
2005/0054404 A1 3/2005 Baerlocher
2005/0054415 A1 3/2005 Kaminkow et al.
2005/0059449 A1 3/2005 Yarbrough
2005/0059467 A1 3/2005 Saffari et al.
2005/0059468 A1 3/2005 Cannon
2005/0059469 A1 3/2005 Gail et al.
2005/0059470 A1 3/2005 Cannon
2005/0059471 A1 3/2005 Cannon
2005/0064932 A1 3/2005 Cannon
2005/0075161 A1 4/2005 McGlone et al.
2005/0096119 A1 5/2005 Lind et al.
2005/0096123 A1 5/2005 Cregan et al.
2005/0101370 A1 5/2005 Lind et al.
2005/0101387 A1 5/2005 Wolf
2005/0119042 A1 6/2005 Chamberlain et al.
2005/0130730 A1 6/2005 Lind et al.
2005/0148382 A1 7/2005 Fox
2005/0164771 A1 7/2005 Lind et al.
2005/0164772 A1 7/2005 Lind et al.
2005/0164773 A1 7/2005 Lind et al.
2005/0167916 A1 8/2005 Banyai
2005/0187014 A1 8/2005 Saffari et al.
2005/0227753 A1 10/2005 Luciano, Jr.
2005/0255906 A1 11/2005 Lind et al.
2006/0084490 A1 4/2006 Khal
2006/0189375 A1 8/2006 Dodge
2006/0237905 A1* 10/2006 Nicely et al. .................. 273/274
2007/0021185 A1 1/2007 Walker et al.
2007/0117611 A1 5/2007 Dodge
2008/0102952 A1 5/2008 Walker et al.
2008/0254894 A1 10/2008 Michaelson et al.
2009/0075715 A1 3/2009 Coleman et al.

(56) References Cited

U.S. PATENT DOCUMENTS

2009/0197664 A1 8/2009 Schultz
2010/0120489 A1 5/2010 Meyer
2011/0028201 A1 2/2011 Warner et al.
2013/0079098 A1 3/2013 Nicely et al.

* cited by examiner

404

Paytable

| Dice Total | Match | Pay |
|---|---|---|
| 2 | Yes | 15 + Mult |
| 3 | No | 10 |
| 4 | No | 9 |
| 4 | Yes | 9 + Mult |
| 5 | No | 8 |
| 6 | No | 7 |
| 6 | Yes | 7 + Mult |
| 7 | No | 2 |
| 8 | No | 7 |
| 8 | Yes | 7 + Mult |
| 9 | No | 8 |
| 10 | No | 9 |
| 10 | Yes | 9 + Mult |
| 11 | No | 10 |
| 12 | Yes | 15 + Mult |

PATTERN MATCHING IN A KENO GAME

BACKGROUND

The present disclosure relates generally to wager-based games, and more particularly to awarding bonuses during a keno game. Games can be played in gaming casinos and other entertainment locations that feature different single and multi-player gaming systems (e.g., slot machines). The gaming machines may include a number of hardware and software components to provide a wide variety of game types and game playing capabilities. Online game services enable players to play a variety of games from their computing devices.

A typical keno game provides a keno board having eighty spots, numbered from one to eighty. After a player selects up to ten spots on the keno board, the keno game generates twenty (or more) draws on the keno board. Keno payouts are based on the player's wager and a number of matches detected between the automatically generated draws and the player selected spots. For example, the player may select spots 4, 10, 13, and 45, while the draws may include 1, 2, 4, 6, 7, 16, 22, 29, 41, 57, 61, 64, 65, 67, 70, 72, 73, 74, 75, 79. In this example, a single player selected spot matched one of the draws (i.e., the spot numbered four). The player may receive a payout in accordance with a payout table.

SUMMARY

A method for determining an award during a keno game includes, but is not limited to any of combination of: generating, by one or more processors, a predetermined number of draws for placement on a keno board during the keno game, wherein the keno board includes a predetermined number of spots; evaluating, by the one or more processors, a plurality of sub-regions of the keno board associated with the keno game for matches between the generated draws and one or more predetermined patterns; and determining, by the one or more processors, an award based on results of the evaluating step.

An electronic gaming machine for playing an electronic keno game comprising: display configured to display the electronic keno game to a player including a keno board; a user-input panel; and a game controller having one or more data processors, and one or more storage devices storing instructions. The instruction when executed by the one or more data processors, cause the one or more data processors to perform operations comprising: generating a predetermined number of draws for placement on a keno board during the keno game, wherein the keno board includes a predetermined number of spots; evaluating a plurality of sub-regions of the keno board associated with the keno game for matches between the generated draws and one or more predetermined patterns; and determining an award based on results of the evaluating step.

A computer-readable storage medium having machine instructions stored therein. The instructions being executable by a processor to cause the processor to perform operations comprising: generating a predetermined number of draws for placement on a keno board during the keno game, wherein the keno board includes a predetermined number of spots; evaluating a plurality of sub-regions of the keno board associated with the keno game for matches between the generated draws and one or more predetermined patterns; and determining an award based on results of the evaluating step.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Figure 1:
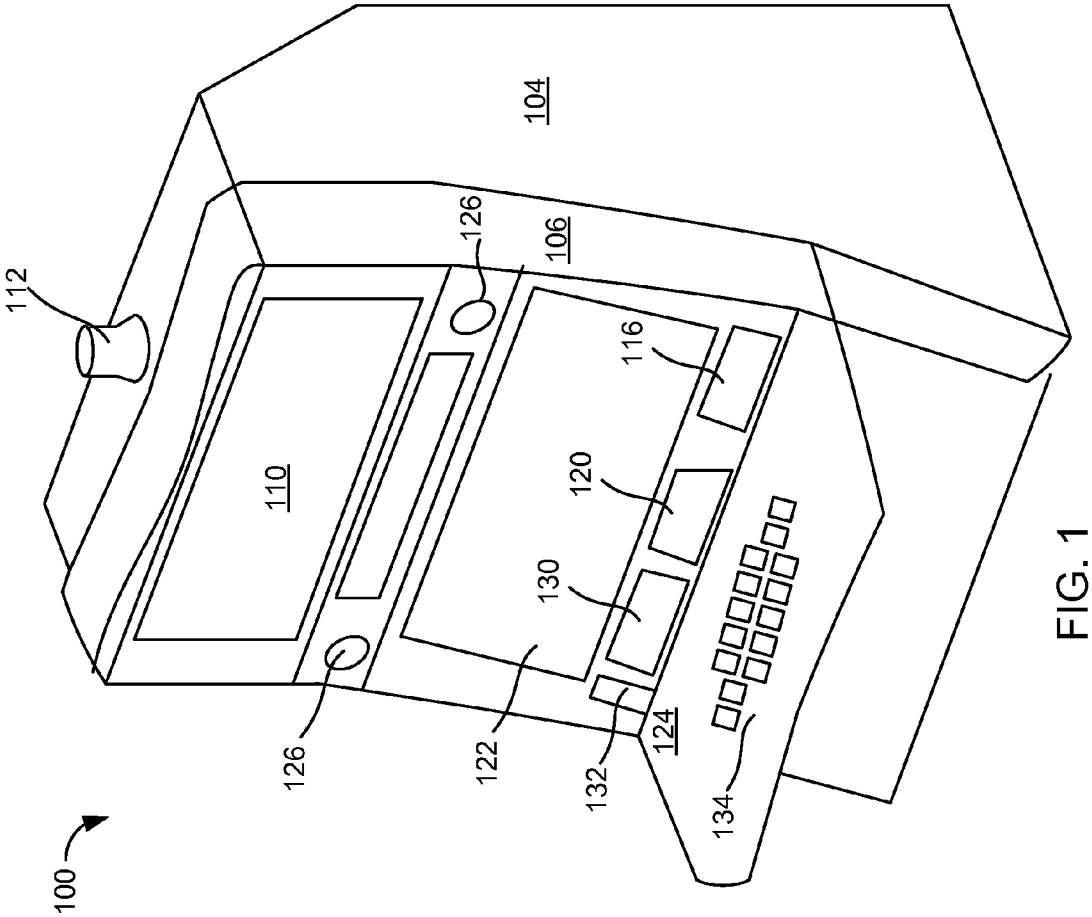
FIG. 1 is a diagram of an electronic gaming machine, in an accordance with an example implementation.

Numerous specific details may be set forth below to provide a thorough understanding of concepts underlying the described embodiments. It may be apparent, however, to one skilled in the art that the described embodiments may be practiced without some or all of these specific details. In other instances, some process steps have not been described in detail in order to avoid unnecessarily obscuring the underlying concept.

According to various embodiments disclosed herein, a keno game, played on a gaming machine or on a player's computing device, may be configured to determine an award when draws on the keno board match one or more predetermined patterns. In some embodiments, the predetermined patterns may include the patterns of pips on a six-sided die. In these embodiments, each side of the die represents a pattern. In these embodiments, the draws shown on the keno board may be evaluated against the six die patterns. For example, a side of the die with a single pip in the center represents a pattern of a three by three region having a single mark in the center.

In other embodiments, the one or more predetermined patterns may include one or more Tetris shapes (i.e., shapes composed of four square blocks each), or other type of shapes including, but not limited to, shapes composed of variable number of square blocks each, various geometric shapes (e.g., triangles, circles, squares, rectangles, etc.), shapes of animals, letters, numbers, constellations or any other types of objects or shapes.

In some embodiments, the predetermined patterns used for determining awards or bonuses during keno games can include various combinations of different types of shapes. For example, the predetermined patterns used in a keno game can include three Tetris shapes, a triangle shape covering a two by three region, and two die patterns including a die pattern with three pips and a die pattern with five pips. The keno game can be configured to display different predetermined patterns to a player for every game. For example, during a first keno game, six die patterns may be used to calculate awards, while during a second game, Tetris shapes may be used. In some embodiments, the keno game may enable the player to choose the patterns they would like to be used for determining awards or bonuses from a plurality of available patterns.

In some embodiments, corruption of a die pattern by other draws may not be allowed. For example, if a die pattern with three pips is found in a three by three region that also includes a draw in one of the other remaining six spots, then this region may not qualify for a match/"hit". However, when a three by three region is found on the keno board with a single mark in the center and no other marks in the other eight spots in the three by three region, a match is found for a die pattern with single pip in the center.

Various sub-regions of the keno board may be evaluated against the predetermined patterns. In the example of the die patterns, all three by three regions of the keno board may be evaluated against the die patterns. When at least a predetermined threshold number of matches (e.g., seven or more matches) between patterns and draws is found, one or more awards may be determined for the player. In some embodiments, an award is calculated based on the number of patterns detected on the board and/or the kind of the patterns detected. In these embodiments, a paytable may provide the payout based on the number of detected matches. For example, the paytable may specify that if six or more pattern matches are detected, then the player's bet multiplied by five credits is awarded. In another example, a paytable may specify correspondences between a total number of detected patterns on the keno board, and a number of credits that may be awarded to the player. In another example, particular patterns found on the board may be worth more than others.

In some embodiments, only the award discussed above is awarded to the player. In other embodiments, in addition to or instead of the award discussed above, a second award is calculated by throwing a plurality of fair weighted dice a number of times. For example, two dice may be thrown five times. Each time the dice are thrown, the total sum of the pips shown on the upper surfaces of the thrown dice may be used to calculate a number of credits to be awarded in accordance with a paytable. For example, when the two dice are thrown, the upper side of the first die may show two pips, while the upper side of the second die may show three pips. In this example, the total number of pips between the two thrown dice is five. A paytable may be utilized to determine the payout, and may specify that when the total number of pips on the upper surface of the thrown dice equals five, the payout may equal to a predetermined number of credits (e.g., eight credits). Once the dice is thrown the predetermined number of times (e.g., five times), the award may be calculated as a total sum of the number of credits received during each throw or award round. In some embodiments, the award may involve awarding points, credits, avatars, money, free games, etc., or any combination thereof.

In these embodiments, when the fair weighted dice is thrown, and the number of pips on the two upper surface sides of the thrown dice match, the player is awarded a particular number of credits according to the paytable, and may also get to throw an additional die (e.g., may be called a "multiplier" die) whose results will be used as a multiplier of the awarded credits during the award round. For example, a first thrown die and a second thrown die may each show six pips. In this example, the player may be awarded the number of credits specified in the paytable corresponding to the dice total of twelve pips (e.g., fifteen credits). Then, the result of the additional thrown die is multiplied by fifteen to arrive at the total number of credits awarded to the player during this dice throw (e.g., the additional dice may show two pips, and the total number of credits awarded would be fifteen times two). In other embodiments, when the upper surfaces of both dice during an award round show the same number of pips, the payable amount to the player may be the result of a number of credits earned during the award round multiplied by a predetermined number (e.g., 2). In these embodiments, an additional die is not rolled to determine the multiplier value. In other embodiments, the results of the additional die throw are used to determine additional credits and/or additional bonus/award triggers.

Referring to FIG. 1, a perspective drawing of an electronic gaming machine 100 is shown in accordance with described embodiments. The gaming machine 100 may include a main cabinet 104. The main cabinet 104 may provide a secure enclosure that prevents tampering with device components, such as a game controller (not shown) located within the interior of the main cabinet 104. The main cabinet 104 may include an access mechanism, such as a door 106, which allows the interior of the gaming machine 100 to be accessed. Actuation of the door 106 may be controlled by a locking mechanism. In some embodiments, the locking mechanism, the door 106, and the interior of main cabinet 104 may be monitored with security sensors of various types to detect whether the interior has been accessed. For instance, a light sensor may be provided within the main cabinet 104 to detect a change in light-levels when the door 106 is opened and/or an accelerometer may be attached to the door 106 to detect when the door 106 is opened.

The gaming machine 100 may include any number of user interface devices that convey sensory information to a user and/or receive input from the user. For example, the gaming machine 100 may include electronic displays 110 and/or 122, speakers 126, and/or a candle device 112 to convey information to the user of the gaming machine 100. The gaming machine 100 may also include a console 124 having one or more inputs (e.g., buttons, track pads, etc.) configured to receive input from a user. In one embodiment, the display 110 and/or the display 122 may be a touch screen display configured to receive input from a user. A controller (not shown) within the gaming machine 100 may run a game, such as a wager-based game (e.g., a keno game), in response to receiving input from a user via inputs located in the console 124, display 122, or display 110. For example, inputs located in the console 124 may be operated to place a wager in the game and to run the game. In response, the controller may cause the display 122 to show a wager-based game such as a keno game.

The gaming machine 100 may also include devices for conducting a wager-based game. For example, the gaming machine 100 may include a ticket acceptor 116 and a printer 120. In various embodiments, the gaming machine 100 may be configured to run on credits that may be redeemed for money and/or other forms of prizes. The ticket acceptor 116 may read an inserted ticket having one or more credits usable to play a game on the gaming machine 100. For example, a player of the gaming machine 100 may wager one or more credits within a video keno game. If the player loses, the wagered amount may be deducted from the player's remaining balance on the gaming machine 100. However, if the player wins and is awarded an award, the player's balance may be increased by the amount won and/or awarded. Any remaining credit balance on the gaming machine 100 may be converted into a ticket via the printer 120. For example, a player of the gaming machine 100 may cash out of the machine by selecting to print a ticket via the printer 120. The ticket may then be used to play other gaming machines or redeemed for cash and/or prizes. According to various embodiments, the gaming machine 100 may record data regarding its receipt and/or disbursement of credits.

In one embodiment, the gaming machine 100 may include a loyalty card acceptor 130. In general, a loyalty card may be tied to a user's loyalty account. A loyalty account may store various information about the user, such as the user's identity, the user's gaming preferences, the user's gaming habits (e.g., which games the user plays, how long the user plays, etc.), or similar information about the user. A loyalty account may also be used to reward a user for playing the gaming machine 100. For example, a user having a loyalty account may be given an award turn on the gaming machine 100 or credited loyalty points for playing the gaming machine 100. Such loyalty points may be exchanged for loyalty rewards (e.g., a free meal, a free hotel stay, free room upgrade, discounts, etc.).

Figure 2:
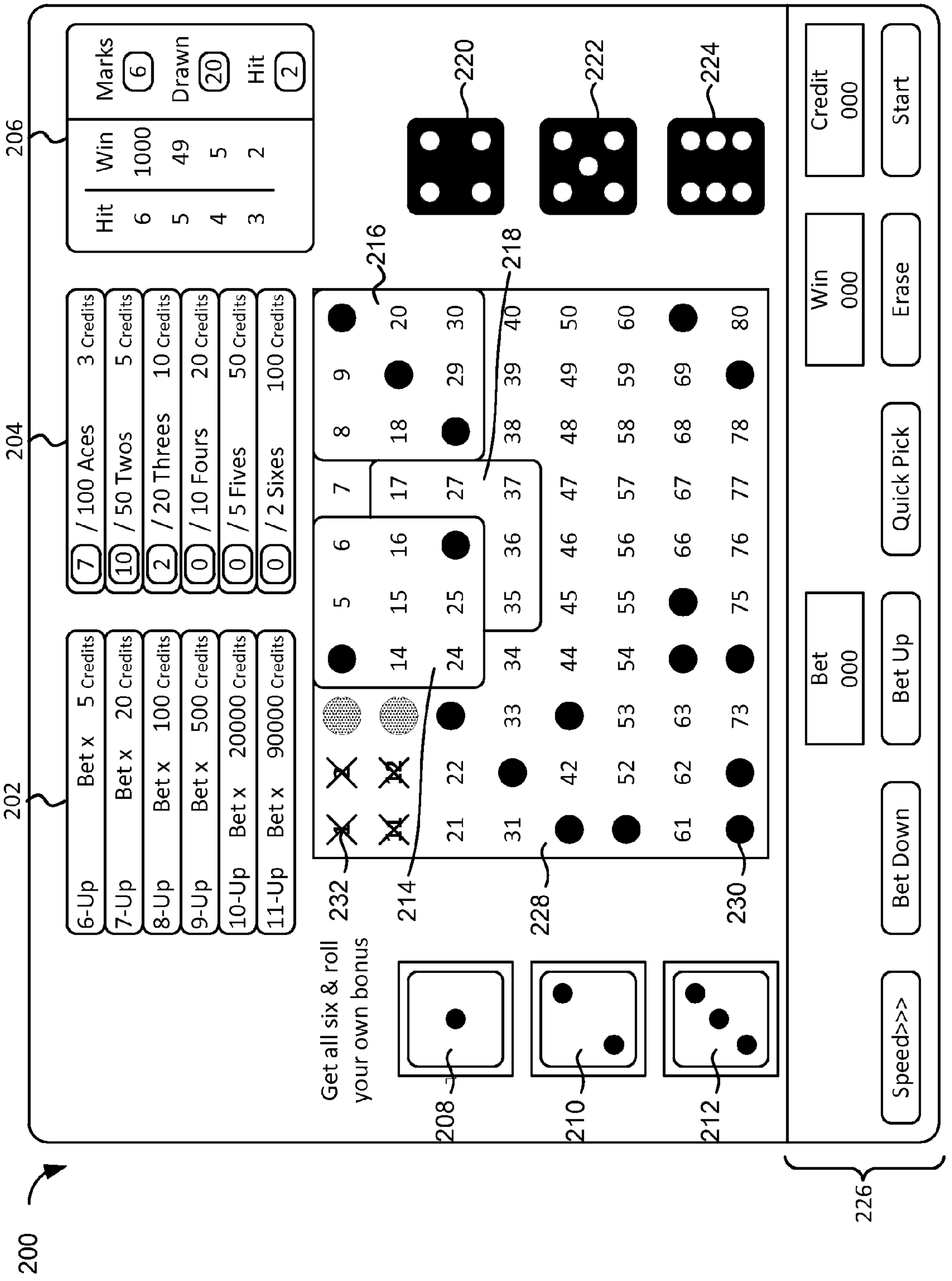
FIG. 2 is an illustration of a keno game incorporating pattern matching with draws, in an accordance with an example implementation.

Referring now to FIG. 2, an illustration of a keno game 200 is shown, according to an exemplary embodiment. The illustration of the keno game 200 can be displayed to a player on a display of a gaming machine (e.g., the display 110 or 122), or on a webpage or an application installed on a computing device utilized by the player.

A keno board 228 with eighty spots is displayed. Each spot on the keno board is numbered from one to eighty. As shown, the player has marked six spots (e.g., spot 232) on the keno board 228 numbered 1, 2, 3, 11, 12 and 13. After the player marked the six spots on the keno board, twenty draws were generated (e.g., draw 230) and displayed on the keno board 228 as black colored circles as well as two circles over numbers 3 and 13 indicating a match between a draw and a user marked spot. An "X" is drawn over the other four spots (i.e., spots numbered 1, 2, 11, and 12) selected by the user indicating that those user marked spots did not match any of the draws.

In some embodiments, the keno game is configured to evaluate the generated draws against one or more predetermined patterns. The keno game 200 illustrates six die patterns 208, 210, 212, 220, 222, and 224. As shown, each of the six die patterns corresponds to a side of a die. The keno board 228 is evaluated for matches of sub-regions of the keno board 228 and the die patterns 208, 210, 212, 220, 222, and 224.

As shown, the pattern 208 includes a three by three region with a single mark in the center, and no other marks in the remaining eight spots. During evaluation of the keno board 228 for the pattern 208, three by three spots sub-regions of the keno board 228 are evaluated for the exact number and placement of draws that match that of the pattern 208 (i.e., only a single mark in the center and no other marks in the three by three region). A sub-region 218 of the keno board 228 is detected as including a draw in the center of the sub-region (i.e., a draw over number 26) and having no other marks. Similarly, a sub-region 214 is identified as a match to the die pattern 210 (i.e., the sub region 214 corresponds to a ninety degree rotation of the pattern 210). Finally, a sub-region 216 is identified on the keno board 228 as a match of the die pattern 212. As shown, no matches for die patterns 220, 222, 224 were found on the keno board 228.

A paytable 202 displays information related to calculating an award for the player when pattern matches are found on the keno board 228. For example, as shown, when six matches are found, the player's award is a calculation of the player's bet multiplied by five credits. A paytable 204 displays another set of information for award calculation. A running tally may be maintained for each of the die patters to track how many of the patters the player has collected. For example, in FIG. 2, the player has collected seven aces; when the player collections one hundred aces, the player will be awarded three credits. Awarding the player with additional bonuses in accordance to paytables 202 and 204, advantageously encourages the player to continue playing the keno game for longer periods of time.

A dashboard 206 summarizes various information shown on the keno board 228. For example, the dashboard 206 states that a total number of spots (i.e., six spots numbered 1, 2, 3, 11, 12, and 13) selected by the player, a total number of generated draws (i.e., twenty spots numbered 4, 10, 19, 23, 26, 28, 32, etc.), and a total number of hits between draws and player marks (i.e., spots numbered 3 and 13). The dashboard 206 further includes a paytable showing the number of credits that can be awarded based on the number of matches between the spots marked by the player and the draws. For example, when all six of the player's marks match six of the twenty draws, 1,000 credits are awarded to the player.

A panel 226 provides various controls to the player including buttons for changing the bet, speed, etc. In addition, the panel 226 shows the total number of credits accumulated by the player. Additional buttons or other controls, and/or statistics can be included in the panel 226 or another portion of the keno game illustration 200.

Figure 3A:
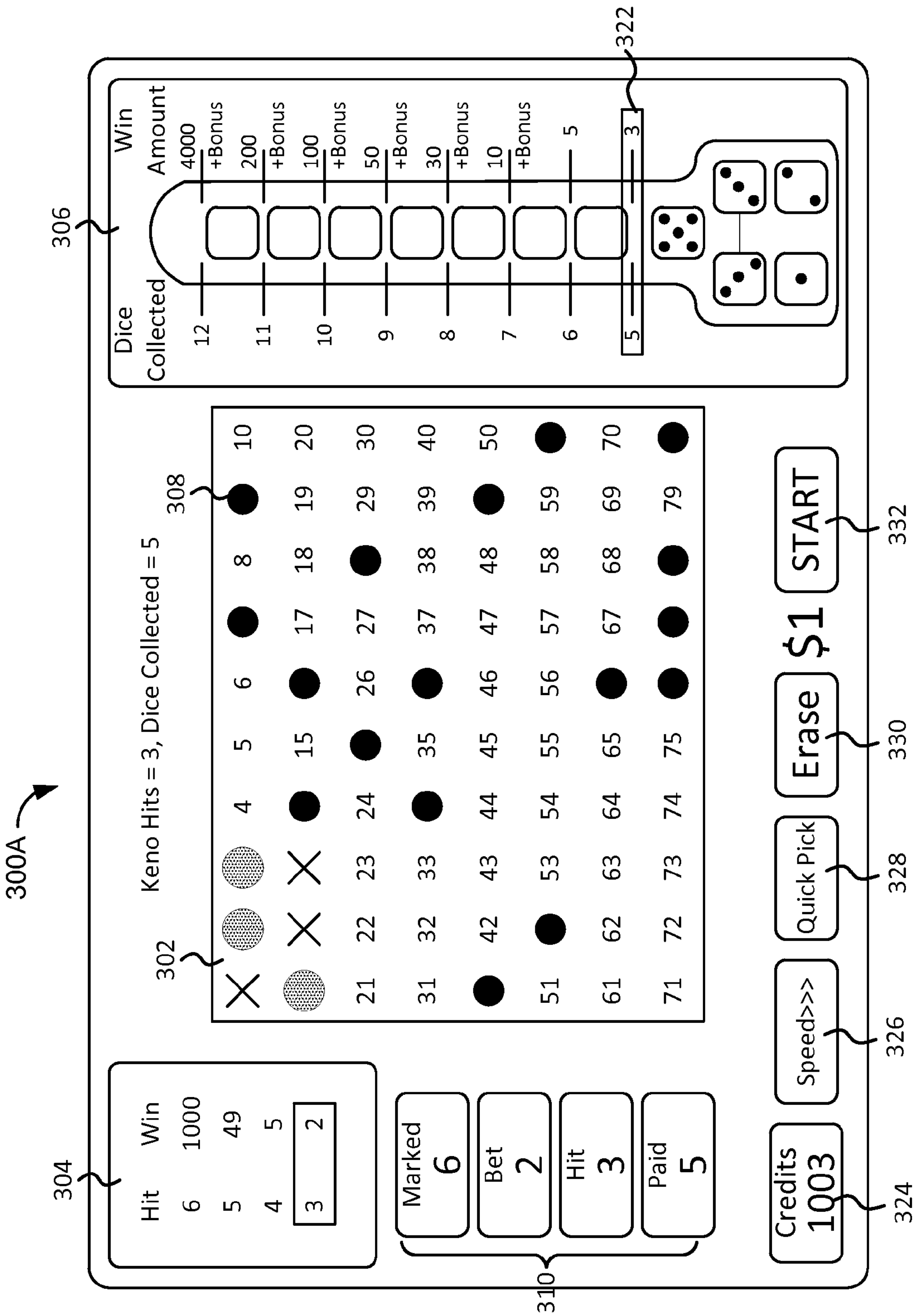
FIGS. 3A-B are further illustrations of a keno game incorporating pattern matching with draws, in an accordance with an example implementation.
Figure 3B:
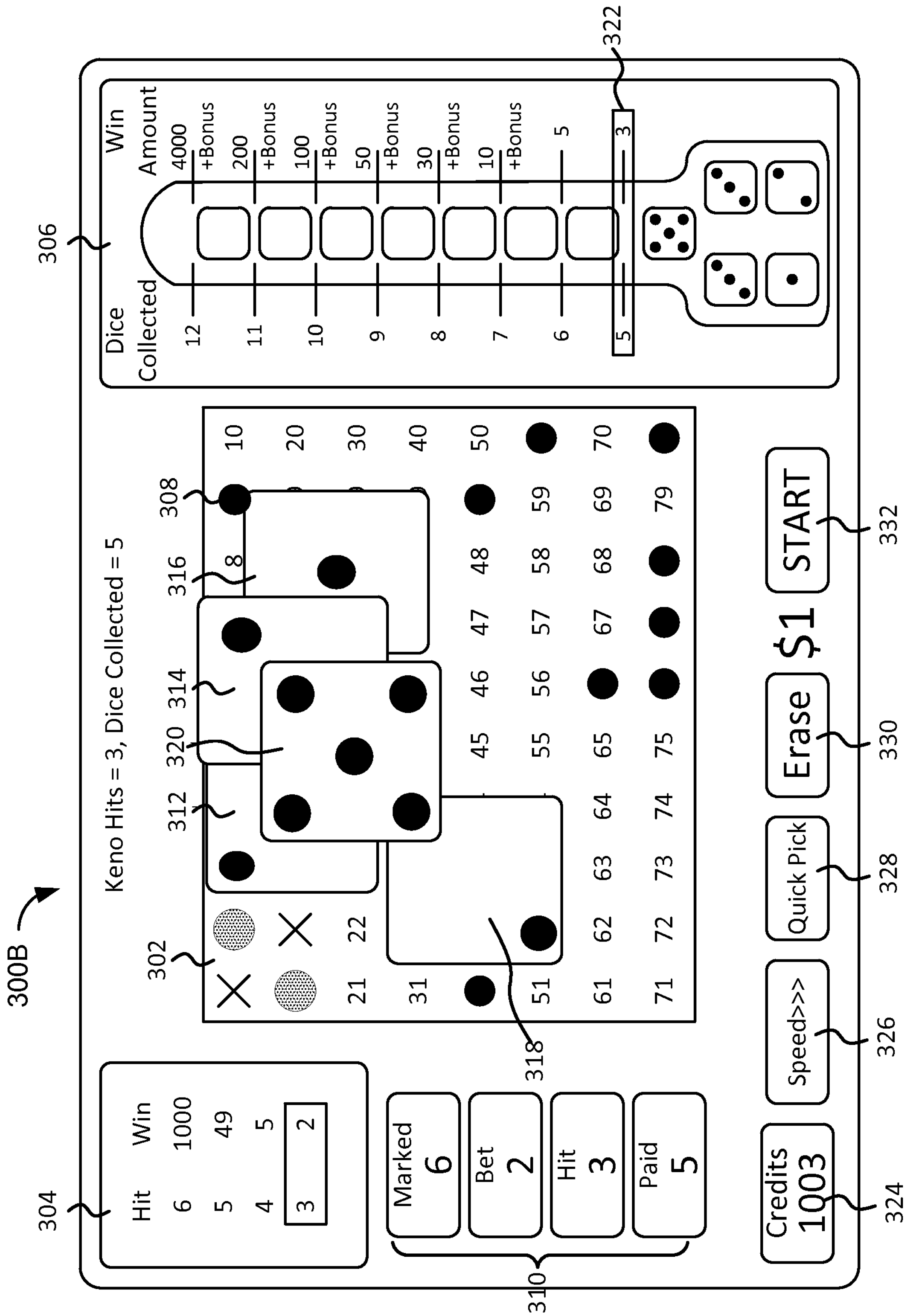

Referring now to FIGS. 3A-3B, illustrations 300A and 300B of another keno game are shown, according to an exemplary embodiment. The illustrations 300A and 300B can be displayed to a player on a display of a gaming machine (e.g., the display 122), or on a webpage or an application installed on a computing device utilized by the player.

The keno game illustration 300A displays a keno board 302 with twenty draws shown as dark dots (e.g., draw 308) and sports marked by the player shown as "X" in the spots numbered as 1, 12, and 13, as well as spots marked by the player that matched draws, shown as grey colored dots in the spots numbered 2, 3, and 11. The keno game illustration 300A includes a paytable 304, which shows a number of credits corresponding to various total number of matches between spots marked by the player and generated draws. For example, as shown on the keno board 302, the spots marked by the player and the generated draws in the spots numbered 2, 3, and 11 matched. Accordingly, the player is awarded two credits as shown in the paytable 304.

Figure 4A:
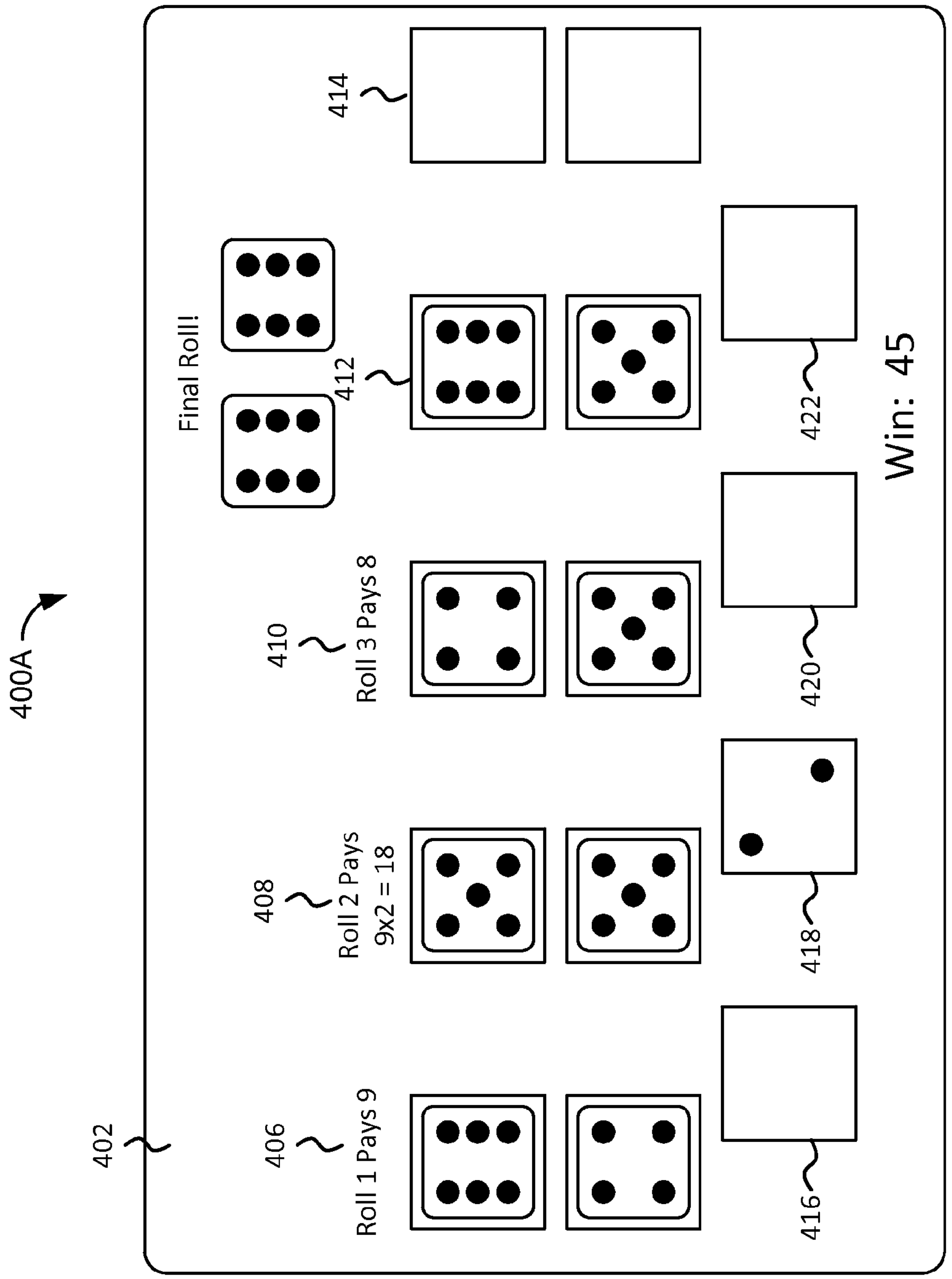
FIGS. 4A-C are illustrations of user interfaces displaying award calculations in a keno game incorporating pattern matching with draws, in an accordance with an example implementation.
Figure 4B:
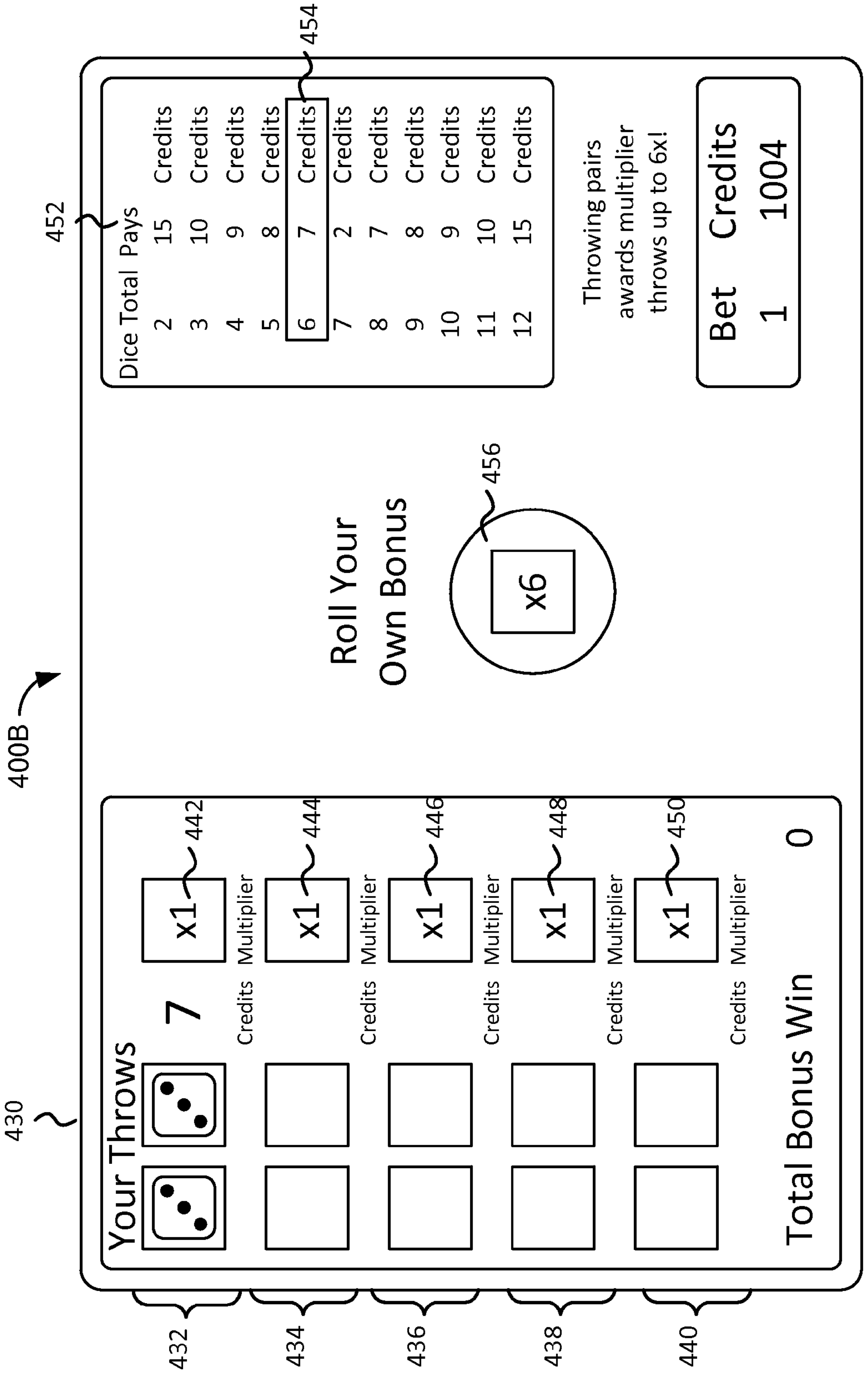
Figure 4C:
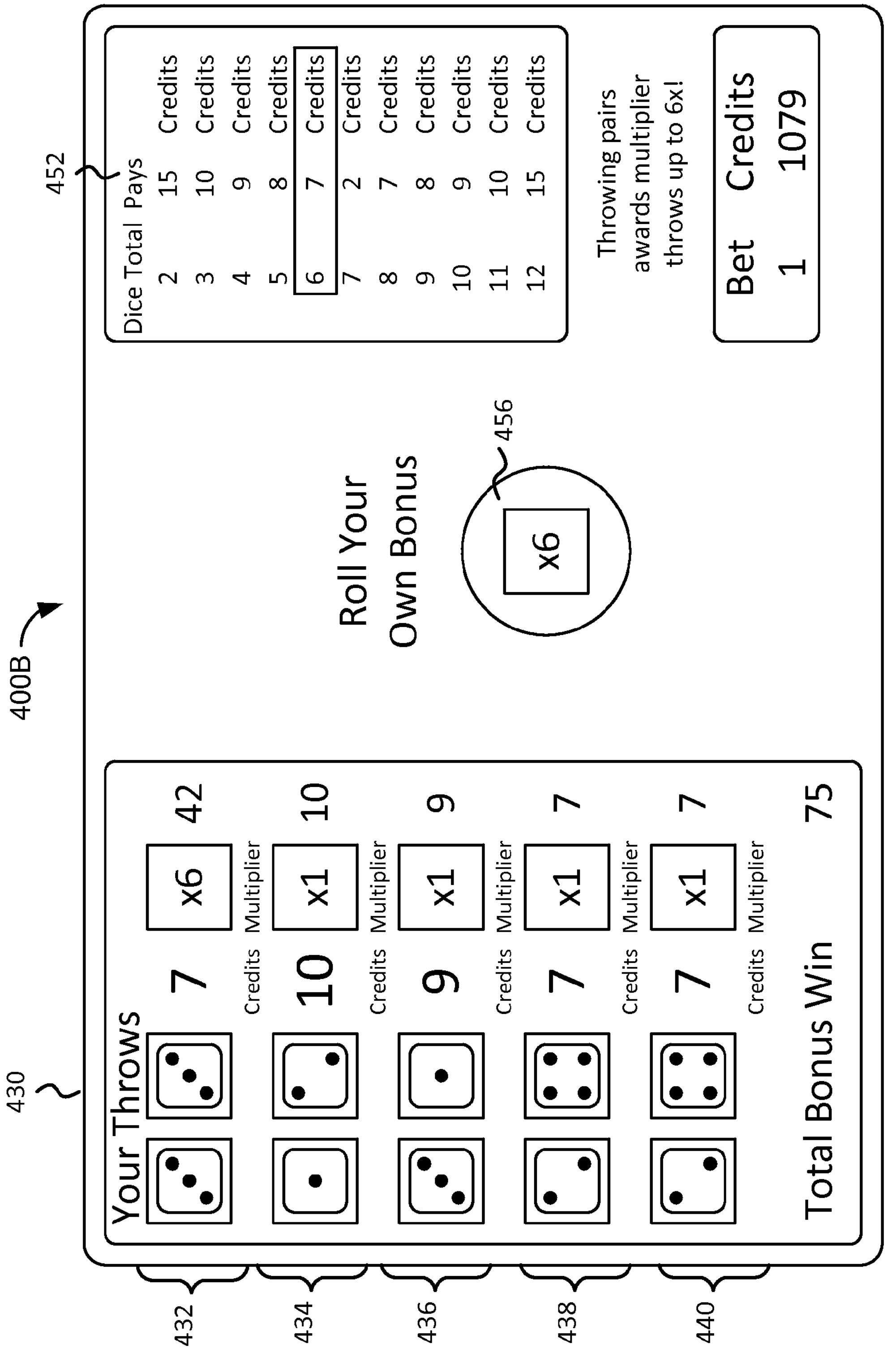

The keno game illustration 300A includes another paytable 306, which shows the payout amount depending on the total number of matches found between predetermined patterns and the generated draws. For example, as shown, when five patterns are identified on the keno board 302, then the player is awarded 3 points. When seven pattern matches are detected on the keno board 302, then the player is awarded 10 credits or points, as well as an additional award. FIGS. 4A-C illustrate exemplary methodologies that may be used to determine the additional award.

In FIG. 3A, the predetermined patterns include patterns of pips on the six sides of the die. As shown in the bottom portion of the paytable 306, five patterns (i.e., die with one pip in the center, a die with two pips, two dice with three pips differently rotated, and a die with five pips) are detected on the keno board 302. FIG. 3B further illustrates the sub-regions 312, 314, 316, 318, and 320 of the keno board 302 that match die patterns. In particular, the sub-region 320 matches a die pattern with five pips, the sub-regions 312 and 314 match die patterns with three pips, the sub region 318 matches a die pattern with two pips, and the sub-region 316 matches the die pattern with one pip in the center. As shown in a section 322 of the paytable 306, the five pattern matches amount to a three credit award for the player.

A portion 310 of the keno game illustration 300A provides the player with total number of spots "marked", "bet", "hit", and "paid". For example, the player marked six spots on the keno board 302, and three of the marked spots "hit" the generated draws. The portion 310 further shows that a total of five credits is "Paid" to the player (i.e., three credits from five detected dice patterns calculated in accordance with the paytable 306, and two credits from detected matches between player marked spots and generated draws calculated in accordance with the paytable 304).

Various controls 324, 326, 328, 330, and 332 enable the player to control the keno game. For example, the control 332 allows the player to start the keno game upon clicking or selecting this control. The control 326 enables the user to control the speed of the draws being generated on the keno board 302. Selecting or clicking on the quick pick control 328 causes the keno game to mark six spots for the player on the keno board 302 so that the player does not have to manually select six spots on the keno board. The control 330 enables the user to erase the marks already made and to start selecting the spots again from scratch. The control 324 provides a total number of points accumulated by the player during a single or multiple keno games.

FIGS. 4A-4C illustrate examples of award rounds that may be played when a player qualifies for an award based on matches between the keno board draws and the predetermined patterns. As shown in FIG. 4A, an illustration 400A displays an award interface 402 and a paytable 404. In some embodiments, the award interface 402 and the paytable 404 are shown to the player. In other embodiments, only the award interface 402 is shown to the player.

An award may be triggered when at least a certain number of patters are detected on the keno board (e.g., seven or more). As shown in the paytable 306 in FIGS. 3A-B, when seven patterns (i.e., die patterns) are detected, the player may be awarded 10 credits or points, and an additional award. If an additional award is triggered, then fair weighted dice are thrown a predetermined number of times. For example, as shown in the award interface 402, the two dice are thrown five times. The results of the first award round is shown in a section 406. As shown, during the first award round, the upper surface of the first thrown die displays six pips, while the upper surface of the second thrown die displays four pips. As a result, the two thrown dice have a total of ten pips. According to the paytable 404, a dice total of ten pays the player nine credits. Therefore, during the first award round, the award equals nine credits.

During the second award round shown in a section 408, the upper surfaces of both dice display five pips. In some embodiments, when the upper surface of both dice shows the same number of pips (e.g., five on one die, and five on another die), the player may get to throw an additional or "multiplier" die. The total number of pips shown on the upper surface of the thrown additional die may be used as a multiplier of the credits awarded during the current award round. For example, during the first award round or dice roll shown in the section 406, the number of pips on the first die and the second die did not match. Accordingly, a space for an area for the additional or "multiplier" die 416 is empty. However, during the second award round or dice roll shown in the section 408, both dice showed five pips, and an area for the additional or "multiplier" die 418 displays a dice roll resulting in two die pips. The number of pips on the multiplier die (i.e., 2 in the area 418) is multiplied by the total number of credits (i.e., 9 credits) awarded from the paytable 404 during the second award round. Accordingly, during the second award round, the player was given an award of eighteen credits (i.e., 9 credits multiplied by 2).

Next, during the third award round shown in a section 410, the upper surface of the first die displays four pips, while the upper surface of the second die displays five pips. Accordingly, the total number of pips between the two rolled dice is nine. Using the paytable 404, the keno game may determine that the player is awarded eight credits. During the fourth award round, the upper surface of the first rolled die displays six pips, while the upper surface of the second rolled die displays five pips. Accordingly, the total number of pips between the two rolled dice is eleven. Using the paytable 404, it is determined that the player is awarded ten credits. Therefore, the total of number of credits earned from the first four award rounds equals to forty five credits (i.e., 9 credits from the first award round, 18 credits from the second award round, 8 credits from the third award round, and 10 credits from the fourth award round). In FIG. 4A, the player has rolled the award dice four times. Once the final fifth award or bonus round is completed, the number of credits collected from the final award round may be added to the forty five credits earned during the first four award rounds to arrive at a final total number of credits awarded to the player as a bonus or an award.

FIG. 4B shows another exemplary illustration 400B of an award interface 430 displaying calculation of an award triggered by a minimum number of pattern matches found on the keno board. Similar to FIG. 4A, FIG. 4B shows five award rounds during which two dice are thrown (i.e., dice throws shown in sections 432, 434, 436, 438, and 440). Results of a completed first award round are shown in the section 432 (i.e., the first thrown die showing three pips and the second thrown die showing three pips). According to a paytable 452, a dice total of six pips earns the player seven credits. Because the two rolled dice result in the same number of pips, an additional or "multiplier" die is thrown (e.g., die 456) and the results of this additional or "multiplier" die is shown in the section 442 (i.e., the multiplier is six). The number of credits awarded to the player during the first bonus round may be the result of multiplication of seven credits by the number of pips shown on the additional or "multiplier" die (i.e., seven credits times the multiplier six).

Still referring to FIG. 4B, the section 434 may show the results of the second bonus round once it is completed. Similarly, the section 436 may show the results of the third award round once the third dice roll is completed, while the sections 438 and 440 may show the results of the fourth and fifth award rounds respectively. The "multiplier" dice 444, 446, 448, and 450 may be rolled if the two dice during the corresponding award round match. The total number of award credits are calculated based on the number of credits calculated during each award round.

FIG. 4C shows the illustration 400C of the award interface 430 displaying results of five completed award rounds resulting in a total award of 75 credits. Similarly, to FIG. 4B, FIG. 4C includes the section 432 displaying results of the first bonus round, during which the first die and the second die each resulted in three pips. According to the paytable 452, the dice total of six pips may be equivalent to seven credits. Because the two rolled dice each resulted in the same number of pips, the "multiplier" die (i.e., shown in the area 456) is thrown, which resulted in six pips, which in turn were used as the multiplier of the earned seven credits. Accordingly, during the first award round, the player earned forty two credits (i.e., seven credits multiplied by six).

The section 434 shows results of the completed second award round. As shown, during the second award round, the first thrown die displays one pip, while the second thrown die displays two pips. Accordingly, the two dice result in a total of three pips. The paytable 452 displays that three pips correspond to ten credits. Therefore, during the second bonus round, the player is awarded ten credits. The multiplier is set to one because the number of pips on the first die did not match the number of pips on the second die.

During the third award round, the first die shows three pips, while the second die shows one pip. Accordingly, the two dice result in a total of four pips. The paytable 452 displays that four pips correspond to nine credits. Therefore, during the third award round, the player is awarded nine credits. The multiplier is set to one because the number of pips on the first die did not match the number of pips on the second die.

Next, during the fourth award round, the first die shows two pips, while the second die shows four pips. Accordingly, the two dice result in a total of six pips. The paytable 452 displays that six pips correspond to seven credits. Therefore, during the fourth award round, the player is awarded seven credits. The multiplier is set to one because the number of pips on the first die did not match the number of pips on the second die.

Finally, during the fifth award round, the first die shows two pips, while the second die shows four pips. Accordingly, the two dice result in a total of six pips. The paytable 452 displays that six pips correspond to seven credits. Therefore, during the fifth award round, the player is awarded seven credits. The multiplier is set to one because the number of pips on the first die did not match the number of pips on the second die. The credits earned during each award round are summed up to a total of seventy five credits. As a result, the player is awarded seventy five credits.

The data shown to the players in various paytables (e.g., paytables 202, 204, 206, 304, 306, 404, 452) may be stored in a data storage of the gaming machine, data storage in a computing device utilized by the player to play the keno game or another storage location (e.g., in a central database access by various gaming machine and computing devices). The various keno game illustrations shown in FIGS. 2, 3A-B, and 4A-C may be displayed to players on display of the gaming machine or on the display of a computing device used for playing the keno game. These user interfaces are provided for illustrative purposes only, and other user interfaces may be used to enable players to play the keno game and receive awards as discussed herein.

In other embodiments, the player is awarded a number of die that they then roll onto a keno board. The landing position of the die may cover a three by three region on the keno board and the pips from the upper surface of the die may be used as draws onto the keno board. For example if the player rolls a "four" and the dice settles on the upper left hand corner of the keno board, the die would cover the 3×3 region that includes keno board spots 1, 2, 3, 11, 12, 13, 21, 22, 23. In this example, the "four" dice pips would then be used as draws and would hit keno board spots 1, 3, 21 and 23. This process may be repeated for other awarded die. In these embodiments, the patterns shown on the thrown dice may be used as draws on the keno board.

Figure 5:
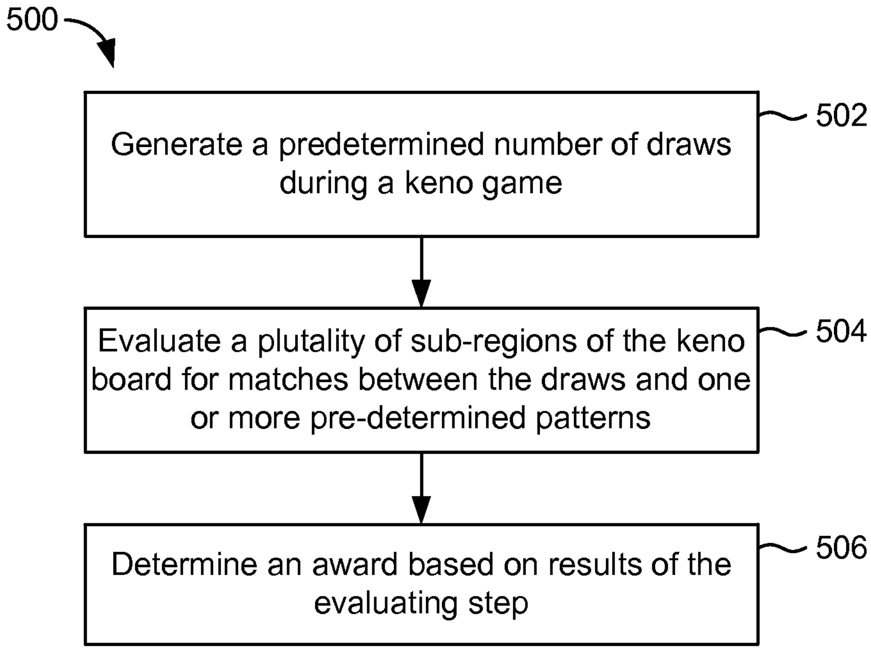
FIG. 5 is a flow diagram of a process for determining an award during a keno game incorporating pattern matching with draws, in an accordance with an example implementation.

FIG. 5 is a flow diagram of a process 500 for calculating an award when draw patterns are detected on the keno board in accordance with an illustrative implementation. The process 500 can be implemented on a computing device (e.g., the gaming machine 100). In one embodiment, the process 500 is encoded on a computer-readable medium that contains instructions that, when executed by the computing device, cause the computing device to perform operations of the process 500.

The process 500 includes generating (step 502) a predetermined number of draws for placement on a keno board associated with a keno game. In some embodiments, the draws are determined using a random number generator, without replacement (i.e., not allowing duplicates) or with replacement (i.e., allowing duplicates). The predetermined number of draws can be twenty or any other number. The generated draws can be shown to a user on a user interface displaying a keno board, one or more paytables, and various controls for enabling players to control the keno game. For example, the generated draws can be dipslayed on the keno board as black dots as shown in FIGS. 2, and 3A-B. In other examples, the draws can be identified to the user in any other fashion (e.g., a listing of numbers corresponding to the selected draws, stars placed over the selected numbers on the keno board, etc.). In other embodiments, the draws are generated by having the player throw a number of die, and the landing position of the die may be used as draws.

The process 500 further includes evaluating (step 504) a plurality of sub-regions of the keno board for matches between the generated draws and one or more predetermined patterns. The predetermined patterns can include any patterns that can be identified on the keno board. In some embodiments, the patterns can include the sides of a die as illustrated in FIGS. 2 and 3A-B. In these embodiments, the sub-regions are three spots by three spots. When a sub-region that matches a pattern is found, the sub-region may only include the marks making up the pattern and no other marks that would corrupt the pattern. In other embodiments, the patterns can include various Tetris shapes or any other shapes that can be identified on an eight by ten rectangular board showing eighty spots.

The process 500 further includes determining (step 506) an award based on the results of the evaluating step. In some embodiments, when a threshold number of patterns are identified, an award calculation is performed. For example, at least six or more patterns need to be identified on the keno board for a player to qualify for an award. A paytable may be utilized for determining a number of credits to award to the player based on the total number of patterns found (e.g., paytables 202, 204, and 306 are exemplary paytables).

A second/additional award or an award instead of the award discussed above may be triggered when at least a particular number of patterns is identified on the keno board (e.g., as shown in FIGS. A and 3B, when at least seven or more patterns are determined as indicated in the paytable 306). The additional award may be determined based on a total number of pips shown on a predetermined number of dice thrown (e.g., two dice) a predetermined number of times (e.g., five times), and wherein during each throw a number of credits is determined based on a predetermined correspondence between a number of pips on the thrown dice and a number credits. FIGS. 4A-4C illustrate exemplary user interface displaying exemplary calculations of the second or additional award. As shown in those Figures, two dice are thrown five times, and the results of each award round are summed up to arrive at the additional award. In some embodiments, when the two dice result in the same number of pips during an award round, a "multiplier" die is thrown to determine the results, which are used as the multiplier for the number of credits earned during the award round.

The number of times the dice are thrown to determine the additional award for the player can be set to any number. For example, the player may be allowed to throw the dice twice. In some embodiments, the concept of the multiplier die is not available. In other embodiments, two dice or another number of dice are thrown to arrive at the multiplier result. In other embodiments, during each additional award round, a single die is rolled instead of two, or any other number of dice. Other methodologies may be utilized to calculate the award for the player upon detection at least a threshold number of patterns on the keno board.

Once the additional award rounds are completed, and the total number of credits earned during an additional award is awarded to the player, a user interface showing a keno board and various paytables as shown in illustrations 200, 300A, and 300B may be presented to the user.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of operating a gaming system, the method comprising:

(a) after receiving, via an acceptor, a physical item associated with a monetary value and identifying the received physical item, establishing, by one or more processors, a credit balance based at least in part on the monetary value associated with the received and identified physical item;

(b) displaying, by at least one display device, a keno board including a predetermined quantity of spots, each spot being associated with a keno number of a set of a plurality of different keno numbers;

(c) forming, by the one or more processors, a player keno number set including one or more of the keno numbers of the set of the plurality of different keno numbers;

(d) forming, by the one or more processors, a gaming system keno number set by selecting a predetermined quantity of the keno numbers from the set of the plurality of different keno numbers;

(e) for each keno number in the gaming system keno number set, displaying, by the at least one display device, an indicator in the respective one of the predetermined quantity of spots with which said keno number is associated;

(f) determining, by the one or more processors, any primary award based on a comparison of the player keno number set and the gaming system keno number set and displaying, by the at least one display device, any determined primary award;

(g) for each of a plurality of sub-regions of the keno board, determining, by the one or more processors, if a pattern formed by any indicators displayed within said sub-region matches one or more predetermined patterns, wherein each predetermined pattern can be matched in a plurality of the sub-regions;

(h) determining, by the one or more processors, any secondary award based on any matched predetermined patterns and displaying, by the at least one display device, any determined secondary award; and (i) if an actuation of a cashout button is received, causing, by the one or more processors, an initiation of a payout associated with the credit balance.

2. The method of claim 1, wherein the one or more predetermined patterns include six predetermined patterns, wherein each predetermined pattern corresponds to a side of a die and is three spots long and three spots wide.

3. The method of claim 2, wherein each of the plurality of sub-regions is three spots wide and three spots long.

4. The method of claim 1, which includes determining, by the one or more processors, that a pattern formed by one or more indicators displayed within a sub-region matches one of the one or more predetermined patterns when the pattern does not include any indicators other than those included in said predetermined pattern.

5. The method of claim 1, wherein the secondary award is based on a number of detected matches.

6. The method of claim 1, wherein the secondary award includes a play of a bonus game, and which includes determining, by the one or more processors, a bonus award based on a predetermined quantity of dice rolls for said play of the bonus game.

7. The method of claim 6, which includes providing, by the one or more processors, at least one additional dice roll upon an occurrence of a triggering event during said play of the bonus game.

8. The method of claim 7, which includes providing, by the one or more processors, an award modifier upon the occurrence of the triggering event during said play of the bonus game.

9. The method of claim 1, which includes determining, by the one or more processors, that a pattern formed by one or more indicators displayed within a sub-region matches one of the one or more predetermined patterns only when the pattern exactly matches said predetermined pattern.

10. An electronic gaming machine comprising:

a housing;

a display supported by the housing;

a plurality of input devices supported by the housing, the plurality of input devices including a user-input panel and an acceptor; and a game controller having one or more data processors and one or more storage devices storing instructions that, when executed by the one or more data processors, cause the one or more data processors to operate with the display and the plurality of input devices to:

(a) if a physical item associated with a monetary value is received via the acceptor, identify the received physical item and establish a credit balance based at least in part on the monetary value associated with the received and identified physical item;

(b) display a keno board including a predetermined quantity of spots, each spot being associated with a keno number of a set of a plurality of different keno numbers;

(c) form a player keno number set including one or more of the keno numbers of the set of the plurality of different keno numbers;

(d) form a gaming system keno number set by randomly selecting a predetermined quantity of the keno numbers from the set of the plurality of different keno numbers;

(e) for each keno number in the gaming system keno number set, display an indicator in the respective one of the predetermined number of spots with which said keno number is associated;

(f) determine any primary award based on a comparison of the player keno number set and the gaming system keno number set and display any determined primary award;

(g) for each of a plurality of sub-regions of the keno board, determine if a pattern formed by any indicators displayed within said sub-region matches one or more predetermined patterns, wherein each predetermined pattern can be matched in a plurality of the sub-regions;

(h) determine any secondary award based on any matched predetermined patterns and display any determined secondary award; and (i) if an actuation of a cashout button is received, initiate a payout associated with the credit balance.

11. The electronic gaming machine of claim 10, wherein the one or more predetermined patterns include six predetermined patterns, wherein each predetermined pattern corresponds to a side of a die and is three spots long and three spots wide.

12. The electronic gaming machine of claim 11, wherein each of the plurality of sub-regions is three spots wide and three spots long.

13. The electronic gaming machine of claim 10, wherein the instructions, when executed by the one or more data processors, cause the one or more data processors to determine that a pattern formed by one or more indicators displayed within a sub-region matches one of the one or more predetermined patterns when the pattern does not include any indicators other than those included in said predetermined pattern.

14. The electronic gaming machine of claim 10, wherein the secondary award is based on a number of detected matches.

15. The electronic gaming machine of claim 11, wherein the secondary award includes a play of a bonus game, and the instructions, when executed by the one or more processors, cause the one or more processors to determine a bonus award based on a predetermined quantity of dice rolls for said play of the bonus game.

16. The electronic gaming machine of claim 15, wherein the instructions, when executed by the one or more processors, cause the one or more processors to provide at least one additional dice roll upon an occurrence of a triggering event during said play of the bonus game.

17. The electronic gaming machine of claim 16, wherein the instructions, when executed by the one or more processors, cause the one or more processors to provide an award modifier upon the occurrence of the triggering event during said play of the bonus game.

18. The electronic gaming machine of claim 10, wherein the instructions, when executed by the one or more data processors, cause the one or more data processors to determine that a pattern formed by one or more indicators displayed within a sub-region matches one of the one or more predetermined patterns only when the pattern exactly matches said predetermined pattern.

19. A non-transitory computer-readable storage medium having machine instructions stored therein, the instructions being executable by a processor to cause the processor to:

(a) after receipt, via an acceptor, of a physical item associated with a monetary value and identification of the received physical item, establish a credit balance based at least in part on the monetary value associated with the received and identified physical item;

(b) cause at least one display device to display a keno board including a predetermined quantity of spots, each spot being associated with a keno number of a set of a plurality of different keno numbers;

(c) form a player keno number set including one or more of the keno numbers of the set of the plurality of different keno numbers;

(d) form a gaming system keno number set by selecting a predetermined quantity of the keno numbers from the set of the plurality of different keno numbers;

(e) for each keno number in the gaming system keno number set, display an indicator in the respective one of the predetermined number of spots with which said keno number is associated;

(f) determine any primary award based on a comparison of the player keno number set and the gaming system keno number set and cause the at least one display device to display any determined primary award;

(g) for each of a plurality of sub-regions of the keno board, determine if a pattern formed by any indicators displayed within said sub-region matches one or more predetermined patterns, wherein each predetermined pattern can be matched in a plurality of the sub-regions;

(h) determine any secondary award based on any matched predetermined patterns and cause the at least one display device to display any determined secondary award; and (i) if an actuation of a cashout button is received, cause an initiation of a payout associated with the credit balance.

20. The non-transitory computer-readable storage medium of claim 19, wherein the one or more predetermined patterns include six predetermined patterns, wherein each predetermined pattern corresponds to a side of a die and is three spots long and three spots wide.

21. The non-transitory computer-readable storage medium of claim 20, wherein each of the plurality of sub-regions is three spots wide and three spots long.

22. The non-transitory computer-readable storage medium of claim 19, wherein the instructions, when executed by the processor, cause the processor to determine that a pattern formed by one or more indicators displayed within a sub-region matches one of the one or more predetermined patterns when the pattern does not include any indicators other than those included in said predetermined pattern.

23. The non-transitory computer-readable storage medium of claim 19, wherein the instructions, when executed by the processor, cause the processor to determine that a pattern formed by one or more indicators displayed within a sub-region matches one of the one or more predetermined patterns only when the pattern exactly matches said predetermined pattern.

* * * * *